US007284056B2

(12) United States Patent
Ramig

(10) Patent No.: US 7,284,056 B2
(45) Date of Patent: Oct. 16, 2007

(54) RESOLVING HOST NAME DATA

(75) Inventor: Randal J. Ramig, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 767 days.

(21) Appl. No.: 10/074,730

(22) Filed: Feb. 13, 2002

(65) Prior Publication Data
US 2003/0069992 A1 Apr. 10, 2003

Related U.S. Application Data

(60) Provisional application No. 60/327,107, filed on Oct. 24, 2001.

(51) Int. Cl.
G06F 15/16 (2006.01)
(52) U.S. Cl. ....................... 709/227; 709/228
(58) Field of Classification Search ................ 709/245, 709/246, 227, 228
See application file for complete search history.

(56) References Cited

U.S. PATENT DOCUMENTS

| 5,729,689 | A | | 3/1998 | Allard et al. ......... 395/200.58 |
| 5,777,989 | A | * | 7/1998 | McGarvey ................ 370/254 |
| 5,799,016 | A | * | 8/1998 | Onweller ................. 370/401 |
| 6,119,171 | A | * | 9/2000 | Alkhatib ................. 709/245 |
| 6,119,234 | A | * | 9/2000 | Aziz et al. ............... 726/11 |
| 6,256,671 | B1 | * | 7/2001 | Strentzsch et al. ........ 709/227 |
| 6,314,469 | B1 | * | 11/2001 | Tan et al. ................ 709/245 |
| 6,449,657 | B2 | * | 9/2002 | Stanbach et al. .......... 709/245 |
| 6,480,508 | B1 | * | 11/2002 | Mwikalo et al. ........... 370/475 |
| 6,795,858 | B1 | * | 9/2004 | Jain et al. ................ 709/226 |
| 6,810,411 | B1 | * | 10/2004 | Coughlin et al. .......... 709/203 |
| 2002/0027915 | A1 | * | 3/2002 | Foti et al. ................ 370/392 |
| 2002/0154624 | A1 | * | 10/2002 | Oishi et al. .............. 370/350 |
| 2004/0093434 | A1 | * | 5/2004 | Hovell et al. ............. 709/249 |

FOREIGN PATENT DOCUMENTS

| WO | WO98/40990 | 9/1998 |
| WO | WO 00/27092 | 5/2000 |

OTHER PUBLICATIONS

Microsoft Press, Microsoft Dictionary , 5th Edition, Copyright 2002, p. 513.*

(Continued)

Primary Examiner—Jason Cardone
Assistant Examiner—Chirag R Patel
(74) Attorney, Agent, or Firm—Workman Nydegger

(57) ABSTRACT

Host name data is "looped-back" from a native host name resolver included in a requesting computer system to a name resolution port that is also included in the requesting computer system. A replacement host name resolver monitors the name resolution port for host name data that is incompatible with name resolution techniques utilized by a network. The replacement host name resolver modifies the otherwise incompatible host name data for compatibility with name resolution techniques utilized by the network. Modifying host name data may include changing a transmission protocol associated with the host name data or formatting non-secure host name data for resolution with secure host name resolution techniques. The replacement host name resolver redirects compatible host name data to a module that may cause the host name data to be resolved into a network address. The network address may be provided to the native host name resolver.

23 Claims, 3 Drawing Sheets

OTHER PUBLICATIONS

Evaluating Caching Schemes for the X.500 Directory, J.C. Bolot and H. Afifi, Proceedings of IEEE International Conference on Distributed Computing Systems—ICDCS '93, Publ. by IEEE Comput. Soc. Press , Los Alamitos, CA, USA, 1993, pp. 112-119.

OSFA: An Object-Oriented Distributed Approach to Network Management, G. Raeder, Integrated Network Management, II. Proceedings of the IFIP TC6/WG6.6 Second International Symposium, Publ. by North-Holland , Amsterdam, Netherlands, 1991, pp. 135-146.

The Ean X.500 Directory Service, G. Neufeld et al., Internetworking: Research and Experience, Publ. in United Kingdom, vol. 3, No. 2, Jun. 1992, pp. 55-81.

Webos: Operating System Services for Wide-Area Applications, A. Vahdat et al., Publ. by Prentice Hall PTR, Upper Saddle River, NJ, USA, vol. 2, 1999, pp. 225-245.

Rowe, Kenneth E. et al. "Reliability of WWW Name Servers" Computer Networks and ISDN Systems, North Holland Publishing, Amsterdam NL, vol. 27, No. 6 Apr. 1995, pp. 773-780.

\* cited by examiner

RESOLVING HOST NAME DATA

CROSS-REFERENCE TO RELATED APPLICATIONS

The present application claims priority from U.S. provisional patent application Ser. No. 60/327,107, filed Oct. 4, 2001 and entitled "Transparent Replacement of Native Host Name Resolver," which provisional application is incorporated herein by reference in its entirety.

BACKGROUND OF THE INVENTION

1. The Field of the Invention

The present invention relates to resolving host name data on a computer network. More specifically, the present invention relates to systems, methods, and computer program products for resolving host name data that is not natively compatible with host name resolution techniques of an associated computer network.

2. Background and Relevant Art

Computer systems are often coupled to one another through networks that allow the computer systems to exchange data with each other. However, the majority of these computer systems are not directly coupled in a one-to-one relationship. Instead, these computer systems typically exist in a network environment wherein multiple computer systems are interconnected and each computer system has a communication path to all the other computer systems included in the network. To reliably exchange data on a network where multiple computer systems are interconnected, there must be some way to identify individual computer systems in the network.

In virtually all networks, "network addresses" are utilized to uniquely identify individual computer systems. When a first computer system sends data to a second computer system, the first computer system may send the data to the unique address that identifies the second computer system. In a large number of networks, including the Internet, this unique address is in the form of a numeric Internet Protocol ("IP") address of either 32 or 128 bits. An IP address may be 32 bits when formed in accordance with Internet Protocol version 4 ("IPv4") and may be 128 bits when formed in accordance with Internet Protocol version 6 ("IPv6").

An IP address formed in accordance with IPv4 is typically a 32 bit address written in the form of four numbers separated by periods, each number ranging from 0 to 255 such as, for example, "100.101.102.103". However, since human-readable names having associated meaning are easier to remember than a series of numbers, addresses are often represented by an alphanumeric domain name. For example, "www.testcorporation.com" may represent the same computer system as the numeric IP address 100.101.102.103. That is, the domain name www.testcorporation.com may facilitate access to a computer system that has the numeric IP address 100.101.102.103.

In an IP environment, the Domain Name Service ("DNS") facilities resolving domain names into numerical IP addresses. During operation, a DNS server receives a DNS request from a computer system on an associated network. A DNS request is typically received at port 53 of the DNS server and typically includes a domain name that is contained in one or more Universal Datagram Protocol ("UDP") packets. The DNS server resolves the domain name into a numeric IP address by searching a table that includes domain names and the numeric IP addresses that are represented by the domain names. After finding an appropriate numeric IP address, the DNS server returns the numeric IP address to the computer system that submitted the request.

Problems may arise during name resolution if a requesting computer system cannot provide a domain name in a format that is compatible with a DNS server. This may occur, for example, when name resolution is requested over a communication link that does not support UDP. One solution to this problem has been to replace binary components utilized by an operating system when requesting resolution of a domain name. That is, to recode and recompile components of the operating system to make them compatible with newer or proprietary name resolution techniques. This may include replacing Application Program Interfaces ("APIs") included in an operating system that facilitate host name resolution. However, changes to such APIs may propagate to other parts of the operating system, resulting in the consumption of substantial programming resources in order to modify the APIs.

Even if substantial programming resources are available, a manufacturer may no longer support an operating system. It is unlikely a manufacturer would create binary replacements for host name resolution modules included in an unsupported operating system. Thus, if the unsupported operating system is widely deployed, it may be costly to upgrade to newer operating systems to gain compatibility with newer or proprietary name resolution techniques.

Therefore, what are desired are systems, methods, and computer program products for resolving host name data, which is not natively compatible with host name resolution techniques of an associated computer network, in a manner that does not require modification of existing operating system modules.

BRIEF SUMMARY OF THE INVENTION

The principles of the present invention provide for resolving host name data that is not natively compatible with host name resolution techniques of an associated computer network. A requesting computer system, which includes a native host name resolver, is assigned as a name server for itself (i.e., the same requesting computer system). This assignment may be made by configuring a name server address associated with the requesting computer system to a "loop-back" address. This results in name resolution requests sent from the native host name resolver being received by the same requesting computer system without such requests actually physically entering onto any associated networks. In an Internet Protocol version 4 ("IPv4") environment, the numeric IP address "127.0.0.1" may be used as a loop-back address and a name server may be a Domain Name Service ("DNS") server.

A name resolution port of the requesting computer system for receiving host name data in a host name resolution protocol is monitored. This may include a replacement host name resolver module monitoring a name resolution port of the requesting computer system. The replacement host name resolver may detect a host name request at the name resolution port of the requesting computer system. Such a host name request may have originated from the native host name resolver. When a host name request is detected, the replacement host name resolver causes the request to be rerouted. In an IP environment, the replacement host name resolver system may monitor port 53 of the requesting computer system for domain names that represent numeric IP addresses. Such domain names may be contained in one or more Universal Datagram Protocol ("UDP") packets.

Host name data is rerouted to a module (such as a module in a resolving computer system or name resolution server) that may resolve the host name data. This may include rerouting the host name data to a server that may resolve the host name data into a network address. In an IP environment, host name data in the form of a domain name may be rerouted to a DNS server that may resolve the domain name into a numeric IP address.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not, therefore, to be considered to be limiting of its scope, the invention will be described and explained with additional specificity and detail through the use of the accompanying drawings in which.

DETAILED DESCRIPTION OF THE PREFERRED EMBODIMENTS

Figure 1:
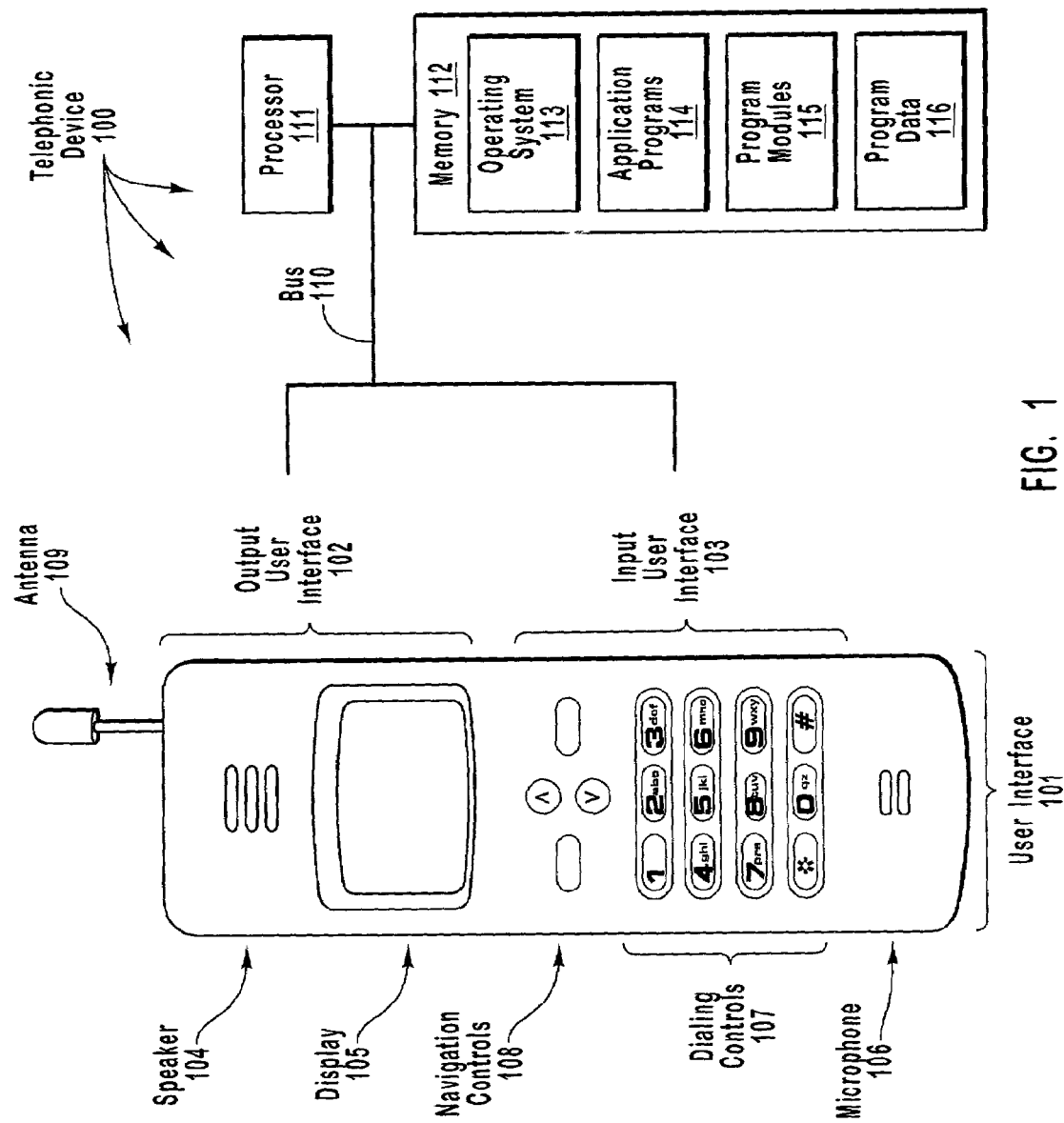
FIG. 1 illustrates an example of a computer system that provides a suitable operating environment for the present invention.

The present invention extends to systems, methods, and computer program products for resolving host name data that is not natively compatible with host name data resolution techniques of a computer network. A requesting computer system may be assigned as a name server for the requesting computer system through the use of a "loopback" address. A native host name resolver included in the requesting computer system may send host name data that is to be resolved. A replacement host name resolver monitors a name resolution port included in the requesting computer system for host name data sent from the native host name resolver. When the replacement host name resolver detects host name data, the replacement host name resolver causes the host data to be rerouted to a module that may resolve the data.

The embodiments of the present invention may comprise a general-purpose or special-purpose computer system including various computer hardware components, which are discussed in greater detail below. Embodiments within the scope of the present invention also include computer-readable media for carrying or having computer-executable instructions or data structures stored thereon. Such computer-readable media may be any available media, which is accessible by a general-purpose or special-purpose computer system. By way of example, and not limitation, such computer-readable media can comprise physical storage media such as RAM, ROM, EPROM, CD-ROM, DVD, or other optical storage devices, magnetic disk storage or other magnetic storage devices, or any other media which can be used to carry or store desired program code means in the form of computer-executable instructions or data structures and which may be accessed by a general-purpose or special-purpose computer system.

When information is transferred or provided over a network or another communications connection (either hardwired, wireless, or a combination of hardwired or wireless) to a computer system, the connection is properly viewed as a computer-readable medium. Thus, any such connection is properly termed a computer-readable medium. Combinations of the above should also be included within the scope of computer-readable media. Computer-executable instructions comprise, for example, instructions and data which cause a general-purpose computer system or special-purpose computer system to perform a certain function or group of functions.

In this description and in the following claims, a "computer system" is defined as one or more software modules, one or more hardware modules, or combinations thereof, that work together to perform operations on electronic data. For example, the definition of computer system includes the hardware components of a personal computer, as well as software modules, such as the operating system of the personal computer. The physical layout of the modules is not important. A computer system may include one or more computers coupled via a computer network. Likewise, a computer system may include a single physical device (such as a mobile phone or Personal Digital Assistant "PDA") where internal modules (such as a memory and processor) work together to perform operations on electronic data.

In this description and in the following claims, a "port" is defined as an endpoint of a logical communication path. When an originating computer system communicates with a destination computer system, the originating computer system may send data from an originating port. Likewise, the destination computer system may receive the data at a destination port. Ports may be permanently assigned for the transfer of certain data or may be temporarily assigned on an ad hoc basis. The physical representation of a port may include one or more hardware modules, one or more software modules, or a combination thereof.

Those skilled in the art will appreciate that the invention may be practiced in network computing environments with many types of computer system configurations, including personal computers, laptop computers, hand-held devices, multi-processor systems, microprocessor-based or programmable consumer electronics, network PCs, minicomputers, mainframe computers, mobile telephones, PDAs, pagers, and the like. The invention may also be practiced in distributed computing environments where local and remote computer systems, which are linked (either by hardwired links, wireless links, or by a combination of hardwired or wireless links) through a communication network, both perform tasks. In a distributed computing environment, program modules may be located in both local and remote memory storage devices.

FIG. 1 and the following discussion are intended to provide a brief, general description of a suitable computing environment in which the invention may be implemented. Although not required, the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing steps of the methods disclosed herein. The particular sequences of such executable instructions or associated data structures represent examples of corresponding acts for implementing the functions described in such steps.

With reference to FIG. 1, a suitable operating environment for the principles of the invention includes a general-purpose computer system in the form of a telephonic device 100. The telephonic device 100 includes a user interface 101 for allowing a user to input information through an input user interface 103, and to review information presented via an output user interface 102. For example, the output user interface 102 includes a speaker 104 for presenting audio information to the user, as well as a display 105 for presenting visual information to the user. The telephonic device 100 may also have an antenna 109 if the telephonic device 100 has wireless capabilities.

The input user interface 103 may include a microphone 106 for translating audio information into electronic form. In addition, the input user interface 103 includes dialing controls 107 represented by 112 buttons through which a user may enter information. Input user interface 103 also includes navigation control buttons 108 that assist the user in navigating through various entries and options listed on display 105.

Although user interface 101 has the appearance of a mobile telephone, the unseen features of user interface 101 may allow for complex and flexible general-purpose processing capabilities. For example, telephonic device 100 also includes a processor 111 and a memory 112 that are connected to each other and to the user interface 101 via a bus 110. Memory 112 generally represents a wide variety of volatile and/or non-volatile memories and may include types of memory previously discussed. However, the particular type of memory used in telephonic device 100 is not important to the present invention. Telephonic device 100 may also include mass storage devices (not shown) similar to those associated with other general-purpose computer systems, including magnetic and/or optical storage devices.

Program code means comprising one or more program modules may be stored in memory 112 or other storage devices as previously mentioned. The one or more program modules may include an operating system 113, one or more application programs 114, other program modules 115, and program data 116.

While FIG. 1 represents a suitable operating environment for the present invention, the principles of the present invention may be employed in any system that is capable, with suitable modification if necessary, of implementing the principles of the present invention. The environment illustrated in FIG. 1 is illustrative only and by no means represents even a small portion of the wide variety of environments in which the principles of the present invention may be implemented.

In accordance with the present invention, program modules, for example, host name resolver modules, as well as associated program data, such as host name data, may be stored and accessed from any of the computer-readable media associated with telephonic device 100. For example, portions of such modules and portions of associated program data may be included in operating system 113, application programs 114, program modules 115 and/or program data 116, for storage in memory 112. Portions of such modules and associated program data may also be stored in any of the magnetic or optical storage devices previously described.

Execution of such modules may be performed in a distributed environment as previously described. For example, a host name resolver module included in a local computer system may resolve host name data that is to be used by a remote computer system. Likewise, a host name resolver module included in a remote computer system may resolve host name data that is to be used by a local computer system.

Figure 2:
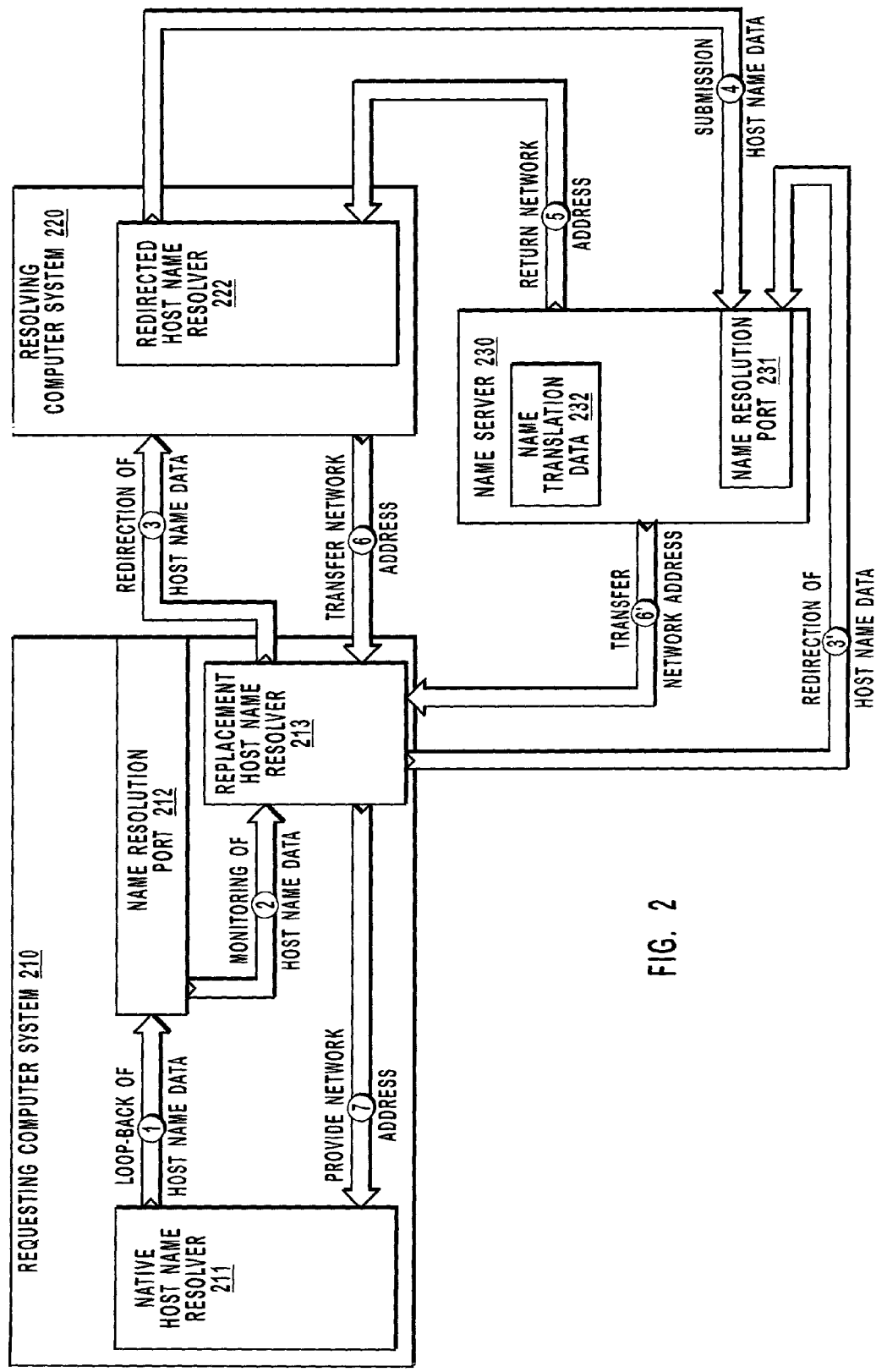
FIG. 2 illustrates an example of some of the functional components that may facilitate resolving host name data that is not natively compatible with host name resolution techniques of an associated computer network.
Figure 3:
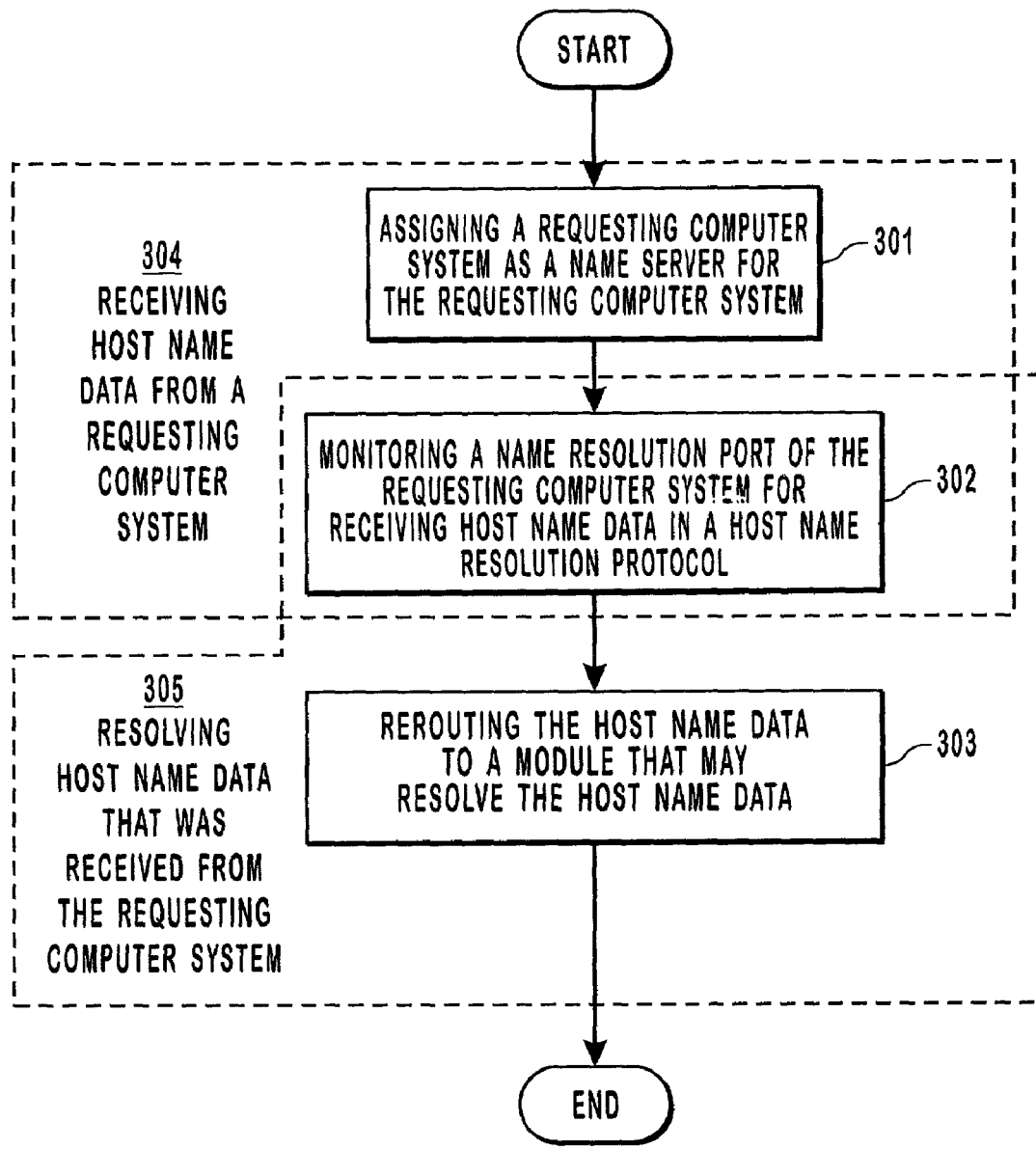
FIG. 3 is a flow diagram illustrating an example of a method for resolving host name data for a computer system.

Shown in FIG. 2 are some of the functional components that may be used to facilitate the resolution of host name data. Shown in FIG. 3 is a flow diagram illustrating a method for resolving host name data. The method in FIG. 3 will be discussed with reference to the functional components included in FIG. 2.

The method in FIG. 3 may begin with a step for receiving host name data from a requesting computer system (step 304). This may include a replacement host name resolver or a resolving computer system receiving host name data from a requesting computer system. Host name data may be received from modules or ports included in the requesting computer system. For example, replacement host name resolver 213 may receive host name data from native host name resolver 211 or name resolution port 212.

Step 304 may include assigning a requesting computer system as a name server for the requesting computer system (act 301). Such an assignment may be facilitated by the use of a "loop-back" address, which essentially causes data to be sent from the computer system to the computer system without the data actually entering onto any associated networks. In an Internet Protocol version 4 ("IPv4") environment, a primary Domain Name Service ("DNS") server may be set to the numeric IP loop-back address "127.0.0.1". Thus, host name data may be looped-back (arrow 1) from native host name resolver 211 to name resolution port 212 without the host name data entering onto any networks associated with requesting computer system 210. In an IPv4 environment, host name data may be sent using the User Datagram Protocol ("UDP") and name resolution port 212 may be port 53 of requesting computer system 210.

Step 304 may also include monitoring a name resolution port of the requesting computer system for receiving host name data in a host name resolution protocol (act 302). This may include replacement host name resolver 213 monitoring name resolution port 212 for host name data sent from native host name resolver 211. In an IP environment, replacement host name resolver 213 may monitor port 53 of requesting computer system 210. In alternate embodiments, monitoring may be performed by a monitoring computer system and a replacement host name resolver may be included in the monitoring computer system. For example, a replacement host name resolver may be included in resolving computer system 220.

Act 302 may also be included in a step for resolving host name data that was received from the requesting computer system (step 305). A replacement host name resolver, monitoring computer system, or other module may resolve host name data that is not natively compatible with available host name resolution techniques. Host name data may not be natively compatible with available host name resolution techniques due to a transport protocol used to transport the host name data.

For example, assume that communication via UDP is not supported between requesting computer system 210 and resolving computer system 220. This may occur, for example, when the requesting computer system 210 is a mobile device docked to the resolving computer system 230, for example through a serial connection which does not support UDP. In some embodiments, replacement host name resolver 213 may monitor host name data (arrow 2) that was looped-back via UDP. When this occurs, replacement host name resolver 213 has essentially received host name data in a format that is not natively compatible with available host name resolution techniques. That is, the host name data could not be rerouted (arrow 3) to resolving computer system 220 due to the lack of support for UDP.

In some embodiments, received host name data may have been modified so that the host name data is compatible with available host name resolution techniques. For example, loop-back of host name data (arrow 1) from native host name resolver 211 to name resolution port 212 may be facilitated by UDP. However, redirection of host name data (arrow 3) from replacement host name resolver 213 to resolving computer system 220 may be facilitated by the Transmission Control Protocol ("TCP"). Thus, host name data may be received at resolving computer system 220 even if communication via UDP is not supported between requesting computer system 210 and resolving computer system 220.

When transferring data in an IPv4 environment, a computer system may specify parameters including an originating address, an originating port, a destination address, a destination port, and a transport protocol. Assume that requesting computer system 210 has the numeric IP address "101.102.103.104" and that name resolution port 212 is port 53 of requesting computer system 210. To cause the loop-back of host name data (arrow 1), native host name resolver 211 may specify parameters associated with the host name data that indicate the originating address is 101.102.103.104, the destination address is 127.0.0.1, the destination port is 53, and the transport protocol is UDP. The originating port may be selected on an ad hoc basis from a group of source ports available to requesting computer system 210. The originating port may be used by a module or computer system to return a network address to native host name resolver 211. Replacement host name resolver 213 may monitor the originating address, originating port, and host name data received at name resolution port 212.

Replacement host name resolver 213 may store the originating address and originating port to facilitate returning a network address native host name resolver 211. To cause redirection of the host name data (arrow 3), replacement host name resolver 213 may then specify new parameters for the host name data that indicate the originating address is 101.102.103.104, the destination address is that of resolving computer system 220, and the transport protocol is TCP. The originating port may be selected on an ad hoc basis from a group of source ports available to requesting computer system 210 and the destination port may be selected on an ad hoc basis from a group of source ports available to requesting resolving computer system 220. The originating port and source port may be used to facilitate data transfer between requesting computer system 210 and resolving computer system 220.

It should be understood that the addresses and ports used in examples throughout this description were selected in an arbitrary manner and that practice of the present invention is not limited to only these addresses and ports. It would be apparent to one skilled in the art, after having reviewed this description, that a wide variety of addresses and ports may be used to facilitate the resolution of host name data.

Other incompatibilities between host name data and name resolution techniques may occur. In some embodiments, a requesting computer system may generate host name data that is incompatible with host name resolution techniques utilized by a resolving computer system. This may occur, for example, if a requesting computer system generates host name data incompatible with Secure DNS techniques used by resolving computer systems.

In accordance with the present invention, host name data received from a requesting computer system may be resolved using Secure DNS even if the requesting computer system is not compatible with secure DNS. For example, in FIG. 2, assume that name server 230 is a secure DNS server and that redirected host name resolver 222 submits host name data (arrow 4) to name resolution port 231 in accordance with secure DNS. If replacement host name resolver 213 receives host name data originating from native host name resolver 211 in a format that is incompatible with secure DNS. Replacement host name resolver 213 may modify the host name data to facilitate compatibility with secure DNS. Replacement host name resolver 213 may then redirect the compatible host name data (arrow 3) to resolving computer system 220. Resolving host name data using secure DNS may be performed in accordance with Internet Engineering Task Force RFC2065, published January 1997.

In some embodiments, computer systems may utilize different addressing schemes. A first computer system may be compatible with IPv4 addressing, while a second computer system may be compatible with Internet Protocol version 6 ("IPv6") addressing. In accordance with the present invention, replacement host name resolver may modify host name data in IPv4 format so the host name data is compatible with name resolution techniques in an IPv6 environment Likewise, replacement host name resolver may modify host name data in IPv6 format so the host name data is compatible with name resolution techniques in an IPv4 environment.

The logic included in replacement host name resolver module 213 is extensible. By utilizing extensible logic, replacement host name resolver 213 may be configured to perform a wide variety of modifications to received host name data. Thus, in addition to changing communication protocols associated with host name data and performing secure DNS name resolution, replacement host name resolver 213 may be configured to perform host name resolution in accordance with yet to be developed name resolution techniques.

Step 305 may include rerouting host name data to a module that may resolve the host name data (act 303). This may include a replacement host name resolver redirecting host name data to a resolving computer system or name server that resolves host name data. Illustrated in FIG. 2, replacement host name resolver 213 may redirect host name data (arrow 3) to resolving computer system 220. However, it may be that replacement host name resolver 213 redirects host name data directly to a computer system that includes name translation data. For example, replacement host name resolver 213 may redirect host name data directly to name resolution port 231 (arrow 3'). Likewise, a computer system that includes name translation data may transfer a network address directly to a replacement host name resolver. For example, name server 230 may transfer a network address directly to replacement host name resolver 213 (arrow 6'). In such embodiments, a resolving computer system, such as resolving computer system 220 may be completely bypassed.

Host name data may be resolved into a network address. For example, name server 230 may utilize name translation data 232 to resolve host name data into a network address. Name server 230 may return the network address (arrow 5) to resolving computer system 220 and resolving computer system 220 may transfer the network address (arrow 6) to replacement host name resolver 213. Likewise, name server 230 may return or transfer a network address directly to replacement host name resolver 213, thus bypassing resolving computer system 220.

Replacement host name resolver 213 may modify a network address to be compatible with native host name resolver 211. A network address received via TCP may be modified for transfer via UDP. Likewise, a network address received in accordance with secure DNS may be modified for transfer in accordance with non-secure DNS. Since the logic included in replacement host name resolver 213 is extensible, it may be that replacement host name resolver 213 performed other operations to modify host name data before redirection or submission. In such embodiments, replacement host name resolver 213 may modify a network address to place the network address in a format that is compatible with native host name resolver 211. Replacement host name resolver 213 may provide a network address (arrow 7) to native host name resolver 211.

In some embodiments, replacement host name resolver 213 may include a user interface. This user interface may be used to receive parameters from a user so as to configure replacement host name resolver 213 for operation in different network environments. For example, host name resolver 213 may be configured to always return the same network address regardless of the host name data that it monitors. This may be done to direct corporate LAN users to a proxy server, to direct wireless users to certain content managed by a mobile service provider, or to direct a computer system to resolve host name data using a proprietary or customized database of network addresses.

The present invention allows an operating system to resolve host names using a native host name resolver that is otherwise incompatible with host name resolution on a network. Host name resolution is performed without requiring an upgrade to the operating system or a binary replacement of the native host name resolver. This has the advantage of increasing the lifetime of an operating system and/or allowing an operating system to resolve host name data on networks that would otherwise be incompatible with the operating system. This increases the chances that computer systems utilizing such operating systems will function properly with newer and/or proprietary host name resolution techniques.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. A method implemented in a requesting computer system that is network connectable to a network, the requesting computer system including a native host name resolver that is not capable of resolving a host name when the requesting computer system is connected to the network due to advances in or proprietary name resolution techniques, the method being for resolving a host name using a replacement resolver so as to extend the functionality of the computer system, extending the useful life of the computer system by allowing the computer system to be used on networks that it was not originally intended to be used with, the method comprising the following:

an act of assigning the requesting computer system as a name server for the requesting computer system, wherein the requesting computer system is a single physical device docked to a resolving computer system;

an act of at a native host name resolver of the requesting computer system requesting resolution of a host name by sending host name data in a first protocol to the requesting computer system by sending the host name data to the name server assigned for the requesting computer system, the host name data being compatible for resolution of the host name by a DNS server, the first protocol being a native protocol of the requesting computer system that is incompatible for resolving host name data over a communication link connecting the requesting computer system to the network;

an act of monitoring a name resolution port of the requesting computer system for receiving the host name data in the first protocol from the requesting computer system;

an act of rerouting the host name data in the first protocol to a replacement host name resolver in the requesting computer system;

an act of sending the host name data from the replacement host name resolver in the requesting computer system using a second protocol to a module at the resolving computer system for resolving the host name data, wherein the second protocol is compatible for resolving host name data over the communication link connecting the requesting computer system to the network; and an act of receiving a resolved address at the native host name resolver of the requesting computer system corresponding to the host name data, wherein the resolving computer system forwards the host name data from the replacement host name resolver in the requesting computer system to a name server, and wherein receiving a resolved address at the native host name resolver of the requesting computer system corresponding to the host name data comprises receiving the resolved address directly from the name server bypassing the resolving computer system.

2. The method as recited in claim 1, wherein the act of assigning the requesting computer system as a name server for the requesting computer system comprises the following:

an act of utilizing a loop-back address to assign the requesting computer system as a name server for the requesting computer system.

3. The method as recited in claim 2, wherein the act of utilizing a loop-back address to assign the requesting computer system as a name server for the requesting computer system comprises the following:

an act of utilizing a defined IP loop-back address to assign the requesting computer system as a name server for the requesting computer system.

4. The method as recited in claim 1, wherein the act of assigning the requesting computer system as a name server for the requesting computer system comprises the following:

an act of assigning the requesting computer system as the primary name server for the requesting computer system.

5. The method as recited in claim 1, wherein the act of assigning the requesting computer system as a name server for the requesting computer system comprises the following:

an act of assigning the requesting computer system as a DNS server for the requesting computer system.

6. The method as recited in claim 1, wherein the act of monitoring a name resolution port of the requesting computer system for receiving the host name data in the first protocol comprises the following:
an act of monitoring a name resolution port of the requesting computer system that is associated with an IP network.

7. The method as recited in claim 6, wherein the act of monitoring a name resolution port of the requesting computer system that is associated with an IP network comprises the following:
an act of monitoring port 53 of the requesting computer system.

8. The method as recited in claim 1, wherein the act of monitoring a name resolution port of the requesting computer system for receiving the host name data in a host name resolution protocol comprises the following:
an act of monitoring a name resolution port for receiving host name data in a host name resolution protocol that is compatible with an IP network.

9. The method as recited in claim 8, wherein the act of monitoring a name resolution port for receiving the host name data in a host name resolution protocol that is compatible with an IP network comprises the following:
act of monitoring a name resolution port for host name data contained in one or more UDP packets.

10. The method as recited in claim 1, wherein the act of monitoring a name resolution port of the requesting computer system for receiving the host name data in the first protocol comprises the following:
an act of a replacement host name resolver monitoring a name resolution port for receiving host name data sent from a native host name resolver.

11. The method as recited in claim 1, wherein the act of monitoring a name resolution port of the requesting computer system for receiving the host name data in the first protocol comprises the following:
an act of a resolving computer system monitoring a name resolution port for receiving host name data sent from a native host name resolver.

12. The method as recited in claim 1, wherein the first protocol is UDP and the second protocol is TCP.

13. The method as recited in claim 1, wherein the first protocol is DNS and the second protocol is secure DNS.

14. The method as recited in claim 1, wherein the act of sending the host name data from the replacement host name resolver in the requesting computer system using a second protocol to a module for resolving the host name data comprises the following:
an act of the replacement host name resolver sending the host name data to a module that was identified by entering one or more parameters in a user interface.

15. The method as recited in claim 1, further comprising:
an act of providing the requesting computer system with a network address by resolving the host name data that was sent to the module.

16. The method as recited in claim 15, wherein the act of providing the requesting computer system with a network address by resolving the host name data that was sent to the module comprises the following:
providing the requesting computer system with a numerical IP address by resolving a domain name that was sent to the module.

17. In a requesting computer system that is network connectable to a network, the requesting computer system including a native host name resolver that is not capable of resolving a host name when the requesting computer system is connected to the network due to advances in or proprietary name resolution techniques, a method for resolving a host name using a replacement resolver so as to extend the functionality of the computer system, extending the useful life of the computer system by allowing the computer system to be used on networks that it was not originally intended to be used with, the method comprising the following:
an act of assigning the requesting computer system as a name server for the requesting computer system, wherein the requesting computer system is a single physical device docked to a resolving computer system;
an act of at the native host name resolver of the requesting computer system requesting resolution of a host name by sending host name data in a first protocol to the name server assigned for the requesting computer system, the host name data being compatible for resolution of the host name by a DNS server, the first protocol being a native protocol of the requesting computer system that is incompatible for resolving host name data over a communications link connecting the requesting computer system to the network;
a step for resolving host name data that originated at the requesting computer system so as to locate a network address for a host system represented by the host name data by using a second protocol that is compatible for resolving host name data over a communications link connecting the requesting computer system to the network through the resolving computer system; and
an act of receiving a resolved address at the native host name resolver of the requesting computer system corresponding to the host name data, wherein the resolving computer system forwards the host name data from the replacement host name resolver in the requesting computer system to a name server, and wherein receiving a resolved address at the native host name resolver of the requesting computer system corresponding to the host name data comprises receiving the resolved address directly from the name server bypassing the resolving computer system.

18. A computer program product for use in a requesting computer system that is network connectable to a network, the requesting computer system including a native host name resolver that is not capable of resolving a host name when the requesting computer system is connected to the network due to advances in or proprietary name resolution techniques, the computer program product for implementing a method for resolving a host name using a replacement resolver so as to extend the functionality of the computer system, extending the useful life of the computer system by allowing the computer system to be used on networks that it was not originally intended to be used with, the computer program product comprising the following:
one or more computer-readable storage media having stored thereon computer-executable instructions, that when executed at the requesting computer system, wherein the requesting computer system is a single physical device docked to a resolving computer system, cause the requesting computer system to perform the method, including:
assigning the requesting computer system as a name server for the requesting computer system, wherein assigning the requesting computer system as a name server for the requesting computer system comprises a native host name resolver of the requesting computer system listing the requesting computer system as the only server available for resolving host names;

at a native host name resolver of the requesting computer system requesting resolution of a host name by sending host name data in a first protocol to the name server assigned for the requesting computer system, the host name data being compatible for resolution of the host name by a DNS server, the first protocol being a native protocol of the requesting computer system that is incompatible for resolving host name data over a communications link connecting the requesting computer system to the network;

monitoring a name resolution port of the requesting computer system for receiving the host name data in the first protocol from the requesting computer system;

rerouting the host name data in the first protocol to a replacement host name resolver in the requesting computer system;

sending the host name data from the replacement host name resolver in the requesting computer system using a second protocol to a module at the resolving computer system for resolving the host name data, wherein the second protocol is compatible for resolving host name data over a communications link connecting the requesting computer system to the network; and receiving a resolved address at the native host name resolver of the requesting computer system corresponding to the host name data, wherein the resolving computer system forwards the host name data from the replacement host name resolver in the requesting computer system to a name server, and wherein receiving a resolved address at the native host name resolver of the requesting computer system corresponding to the host name data comprises receiving the resolved address directly from the name server bypassing the resolving computer system.

19. The computer program product as recited claim 18, wherein the one or more computer-readable media include system memory.

20. The method as recited in claim 1, wherein the requesting computer system is docked to the resolving computer system through a serial connection, wherein the resolving computer system ignores UDP, but does support TCP/IP.

21. A requesting computer system that is network connectable to a network, the requesting computer system including a native host name resolver that is not capable of resolving a host name when the requesting computer system is connected to the network due to advances in or proprietary name resolution techniques, the requesting computer system being configured to resolve a host name using a replacement resolver so as to extend the functionality of the computer system, extending the useful life of the computer system by allowing the computer system to be used on networks that it was not originally intended to be used with, the system comprising the following:

a processor;

one or more program modules stored on one or more computer-readable storage media, wherein the one or more program modules, when executed by the processor, are configured to cause the requesting computer system to perform a method comprising:

an act of assigning the requesting computer system as a name server for the requesting computer system, wherein the requesting computer system is a single physical device docked to a resolving computer system;

an act of a native host name resolver of the requesting computer system requesting resolution of a host name by sending host name data in a first protocol to the requesting computer system by sending the host name data to the name server assigned for the requesting computer system, the host name data being compatible for resolution of the host name by a DNS server, the first protocol being a native protocol of the requesting computer system that is incompatible for resolving host name data over a communication link connecting the requesting computer system to the network;

an act of monitoring a name resolution port of the requesting computer system for receiving the host name data in the first protocol from the requesting computer system;

an act of rerouting the host name data in the first protocol to a replacement host name resolver in the requesting computer system;

an act of sending the host name data from the replacement host name resolver in the requesting computer system using a second protocol to a module at the resolving computer system for resolving the host name data, wherein the second protocol is compatible for resolving host name data over the communication link connecting the requesting computer system to the network; and an act of receiving a resolved address at the native host name resolver of the requesting computer system corresponding to the host name data, wherein the resolving computer system forwards the host name data from the replacement host name resolver in the requesting computer system to a name server, and wherein receiving a resolved address at the native host name resolver of the requesting computer system corresponding to the host name data comprises receiving the resolved address directly from the name server bypassing the resolving computer system.

22. A method as recited in claim 1, wherein the requesting system is a mobile device removably docked to the resolving computer system.

23. A method for resolving a host name when a native host name resolver is unable to communicate with a resolving computer system inasmuch as the host name resolver formats address requests according to a protocol not supported by the resolving computer system, the method comprising the following:

at a requesting computer system that comprises a native host name resolver, a name resolution port and a replacement host name resolver, wherein the requesting computer system is communicatively coupled to a resolving computer system:

an act of the native host name resolver maintaining a list of name servers which can be contacted to resolve a host name, wherein an address of the requesting computer system is the only address in the list of name servers;

an act of the requesting computer system receiving host name data to be resolved into a domain address;

an act of the native host name resolver sending the host name data in an address request to the name resolution port, the address request being sent according to a first protocol;

an act of the replacement host name resolver monitoring the address request to the name resolution port;

an act of re-routing the address request to the replacement host name resolver, and such that the address request according to the first protocol are sent by the native host name resolver and received by the replacement host name resolver without the address request entering a network associated with the requesting computer system;

an act of determining that the resolving computer system does not support address requests in the first protocol;

an act of the replacement host name resolver reformatting the address request to include the host name data in an address request according to a second protocol which is supported by the requesting computer system; and an act of the requesting computer system receiving a network address corresponding to the host name data in the address request sent according to the second protocol, wherein the resolving computer system forwards the host name data from the replacement host name resolver in the requesting computer system to a name server, and wherein receiving a network address corresponding to the host name data in the address request sent according to the second protocol comprises receiving the resolved address directly from the name server bypassing the resolving computer system.

* * * * *